Patented Nov. 3, 1942

2,300,677

UNITED STATES PATENT OFFICE 2,300,677

N-(1-CARBOXY-1-ACYLAMINOETHYL THIO-METHYL) AND N,N'-BIS-(1-CARBOXY-1-ACYLAMINOETHYLTHIOMETHYL) DERIVATIVES OF 4,4'-DIAMINODIPHENYL SULPHONE, THEIR SALTS, AND THE METHOD OF PRODUCING THEM AND THEIR SALTS

Morris S. Kharasch and Otto Reinmuth, Chicago, Ill., assignors to Eli Lilly and Company, Indianapolis, Ind., a corporation of Indiana No Drawing. Application June 3, 1940, Serial No. 338,658

19 Claims. (Cl. 260—397.6)

Our invention relates to certain N-(1-carboxy-1-acylaminoethylthiomethyl) and N,N'-bis-(1-carboxy-1-acylaminoethylthiomethyl) derivatives of 4,4'-diaminodiphenyl sulphone, to their salts, and to the method of producing them and their salts.

The present application is a continuation in part of our co-pending application Serial No. 305,926, filed November 24, 1939.

Our new products have been found to be of very low toxicity, and to be remarkably efficacious on oral, parenteral, and intravenous administration for the treatment of various infections, including streptococcal, pneumococcal, and gonococcal infections, especially those of great virulence. These new products, resulting from the condensation of 4,4'-diaminodiphenyl sulphone with formaldehyde and an N-acylcysteine, share the desirable properties of the general class of compounds resulting from the condensation of 4,4'-diaminodiphenyl sulphone with formaldehyde and a mercapto acid, but in addition are distinguished by their relatively high stability, and remarkably low toxicity. In effect the formation of these new derivatives not only imparts various desirable physical and chemical properties to the parent compound, 4,4'-diaminodiphenyl sulphone, but accomplishes marked detoxification of it as well.

Our new products may be represented by the following formulas:

N,N' - bis - (1 - carboxy - 1 - acylaminoethylthiomethyl) derivatives of 4,4-diaminodiphenyl sulphone.

(1)
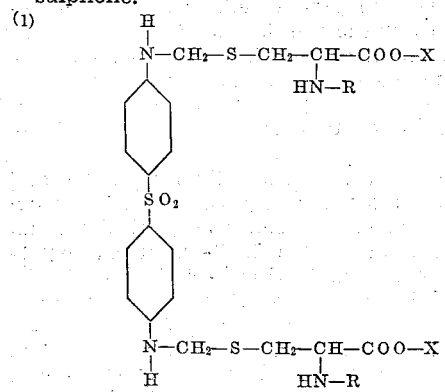

N-(1-carboxy-1-acylaminoethylthiomethyl) derivatives of 4,4'-diaminodiphenyl sulphone.

(2)
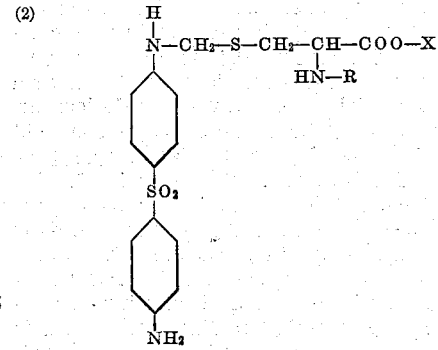

in which R represents an acyl group of the class comprising those derived from the alkanoic and haloalkanoic acids of less than eight carbon atoms, those derived from the aromatic and heterocyclic carboxylic acids, and those derived from the aromatic sulphonic acids, including inter alia the formyl, acetyl, chloroacetyl, β-bromopropionyl, benzoyl, nicotinyl, and benzenesulphonyl groups; and X represents a member of the general class of positive ions, consisting of hydrogen, the alkali metals, the normal equivalents of the alkaline-earth metals, the nitrogen hydro-onium ions derived from ammonia, the alkylamines, the alkanolamines, and the polymethylenediamines, including ethylene diamine.

The salts are all freely soluble in water, and in general relatively stable in the solid state. The alkali and alkaline-earth metal salts are very slightly soluble in absolute alcohol, and insoluble in ether and benzene. The acids differ somewhat as to their solubility in water, and in general are both less water-soluble and less stable than are the salts.

In preparing our new products, we may in general proceed as follows:

To a solution (or suspension) of 4,4'-diaminodiphenyl sulphone in a suitable solvent, such as methyl or ethyl alcohol, or ethylene or propylene glycol, or dioxane, we add either one or two molecular equivalents of formaldehyde, according to whether it is desired to obtain a substitution on one or both of the amino groups; and also add one or two molecular equivalents, depending on the same consideration as before, of an N-acylcysteine of the general formula:

(3)   H—S—CH₂—CH—COOH
                |
               HN—R

It is desirable but not necessary to add the formaldehyde before adding the N-acylcysteine; and the N-acylcysteine may be added, and it is desirable to add it, in moderate excess.

If desired, the N-acylcysteine may be added directly to N,N'-dimethylene-4,4'-diaminodiphenyl sulphone to produce the disubstituted products of Formula 1. Mineral acids have been found to be effective catalysts for this condensation. The starting compound just named may be produced as set forth in our co-pending application Serial No. 338,659 filed June 3, 1940.

In either case, the ingredients which are brought together react to produce an acid of the type shown in Formula 1 or Formula 2 above, with X signifying hydrogen; but that acid is in solution. To obtain such acid in solid form, we add a large volume of water to precipitate that acid. This precipitation may be facilitated by the addition of sodium chloride or other salting-out reagent. The solid acid thus obtained may be separated from the supernatant liquid in suitable manner, as by filtering, decanting, or centrifuging. As thus obtained it is an amorphous mass. This amorphous mass is washed well with water, and then dried, as in a vacuum desiccator.

Salts may readily be obtained from the acid so produced. To this end, the acid, as represented by Formula 1 or Formula 2 with X signifying hydrogen, is dissolved in a non-aqueous solvent, suitably in absolute alcohol, and is treated with a solution in the same solvent of a desired base, such as sodium hydroxide or ethoxide, ammonia, or the desired alkyl- or alkanolamine or polymethylenediamine. A salt is formed by the resultant reaction, and that salt usually separates because of its relative insolubility in the solvent used. If precipitation does not occur, or is incomplete, it may be produced or brought to completion by the addition of dry ether or acetone.

When salts of the disubstituted acid of Formula 1 are desired, it is possible to obtain either a mono-salt or a di-salt by substituting the desired basic element or radical in only one or in both of the two carboxyl groups. For example, if it is desired to obtain a mono-salt, an alcohol solution of sodium ethoxide, for instance, is poured into an alcohol solution of the acid, whereupon, with chilling if necessary, the mono-salt (here the mono-sodium salt) precipitates. If it is desired to obtain the di-salt, the simplest way is to reverse the pouring procedure. An alcohol solution of the acid is poured into an alcohol solution of sodium ethoxide (taking sodium as an example); by which procedure the precipitate which forms is the di-salt. In either case, it is desirable to use an amount of the sodium ethoxide which is about double what would be called for on a molecular equivalency basis; although that is not imperative.

Examples of the general processes are as follows:

*Example I.*—To five grams of 4,4'-diaminodiphenyl sulphone suspended (with some dissolving) in 25 cc. of 70% alcohol are added 4.5 cc. of formalin (36% formaldehyde) and 6.5 grams of N-acetylcysteine. The mixture is allowed to stand for several hours. It is then treated with sodium carbonate, and the insoluble material then present is removed, as by filtration, and rejected. The filtrate is chilled, and acidified with hydrochloric acid. A pale yellow gum separates. The pale yellow gum is dried in vacuum, desirably over phosphorus pentoxide. This yellow gum is N,N'-bis-(1-carboxy-1-acetylaminoethylthiomethyl)-4,4' diaminodiphenyl sulphone which has the following formula:

(4)
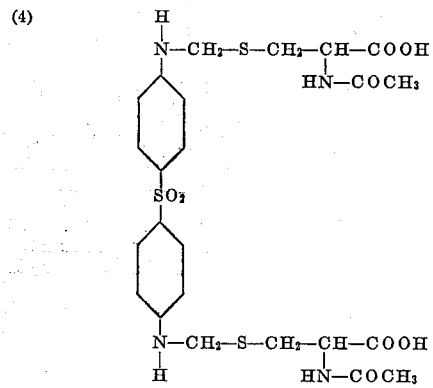

This product, represented by Formula 4, is then dissolved in absolute alcohol, and the solution is filtered if necessary. To this alcoholic solution, an alcohol solution of sodium hydroxide is added. A precipitate separates, and is collected on a filter and dried in vacuo. An analysis for nitrogen showed 8.58%, which is in good agreement with the calculated value, 8.72%, required by the following formula:

(5)
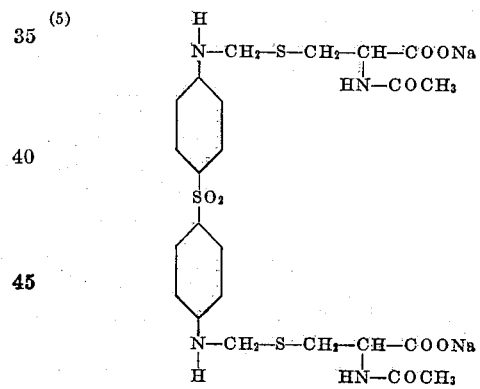

*Example II.*—The process of Example I is repeated through the production of N,N'-bis-(1-carboxy-1-acetylaminoethylthiomethyl)-4,4'-diaminodiphenyl sulphone, shown in Formula 4. From this acid we can prepare either mono-substituted or di-substituted salts in better yields than by the process of Example I by employing an ethoxide (sodium ethoxide, for example) rather than the (sodium) hydroxide in the process; and we can prepare either the mono-substituted salt or the di-substituted salt depending upon the manner of adding the reagents. To obtain the mono-substituted salt, we add the ethoxide to the acid; while to prepare the di-substituted salt we preferably add the acid to the ethoxide.

To prepare the mono-sodium salt, we add about two molecular equivalents of sodium ethoxide dissolved in absolute ethyl alcohol to an alcohol solution of the N,N'-bis-(1-carboxy-1-acetylaminoethylthiomethyl)-4,4'-diaminodiphenyl sulphone. During this addition the entire mixture is chilled to about 5° C. The mono-sodium salt separates at once. It is allowed to stand for a few minutes (say ten to fifteen), and is then collected on a filter, and is dried in vacuum. Analysis for sodium of this salt indicates that only the hydrogen atom of one of the carboxyl groups is replaced by a sodium atom; and a water solution of this sodium salt is acid to litmus. This mono-sodium salt has the following formula:

(6)
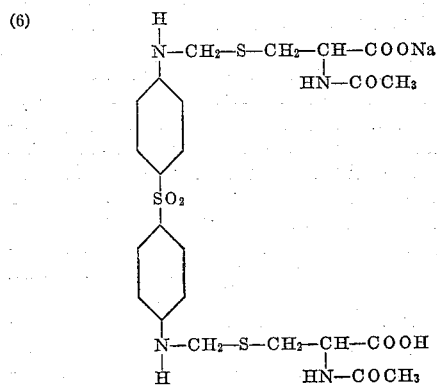

To prepare the di-sodium salt, 4 molecular equivalents of sodium ethoxide are dissolved in absolute alcohol, and the whole is well cooled. To this alcohol solution of sodium ethoxide, we add an alcohol solution of one mole of the N,N'-bis-(1-carboxy-1-acetylaminoethylthiomethyl)-4,4'-diaminodiphenyl sulphone. The di-sodium salt then separates at once, and can be collected on a filter and dried in vacuum. Analysis for sodium of this salt indicates that the hydrogen atoms of both carboxyl groups have been replaced by sodium atoms, and a water solution of this salt is approximately neutral to litmus. This di-sodium salt has the Formula 5 above.

Both the mono-sodium salt and the di-sodium salt are effective therapeutic agents.

*Example III.*—Examples I and II may be repeated, save that only one-half the quantities of formaldehyde and N-acetylcysteine are used. The resultant intermediate and final products are the mono-substituted 4,4'-diaminodiphenyl sulphone and its sodium salt, which are represented by the following formulas:

(7)
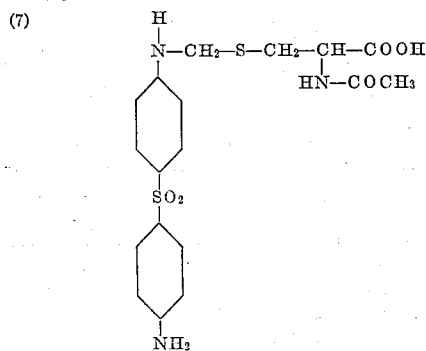

(8)
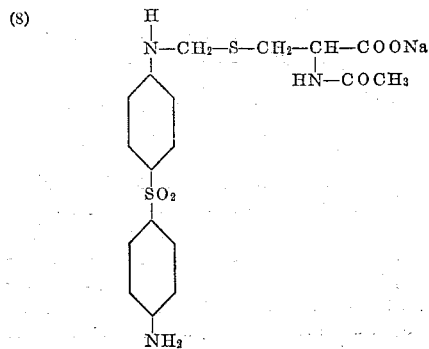

*Example IV.*—The disubstituted acid of Example I may be produced by condensation of the N-acetylcystein with N,N'-dimethylene-4,4'-diaminodiphenyl sulphone. This may be accomplished by the following procedure:

N,N'-dimethylene-4,4'-diaminodiphenyl sulphone, suspended in methyl alcohol, dioxane, ethyl alcohol, or other suitable solvent is treated with two (or a slight excess over two) molecular equivalents of N-acetylcysteine, and a small amount of a strong acid, preferably hydrochloric acid, as a catalyst. The total concentration of the acid catalyst need not exceed 0.05% in solution. Instead of hydrochloric acid one may use any non-oxidizing mineral acid or any organic acid which has an ionization constant of about $10^{-3}$ to $10^{-2}$, such as maleic acid. The following reaction takes place.

(9)
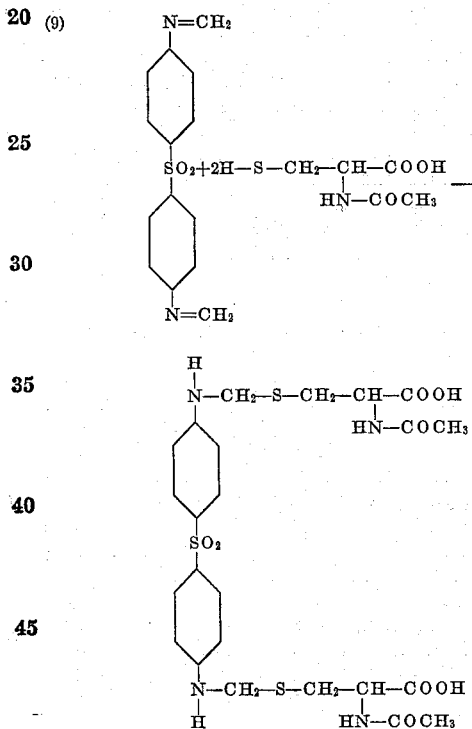

The compound N,N'-bis-(1-carboxy-1-acetylaminoethylthiomethyl)-4,4'-diaminodiphenyl sulphone, which is thus produced, is in solution. This free acid can be isolated as described as in Example I. The salts of this derivative, for example sodium salt, can be obtained as the salts were produced in Examples I and II.

If instead of two molecular equivalents of N-acetylcysteine only one molecular equivalent is used the reaction is as follows:

(10)
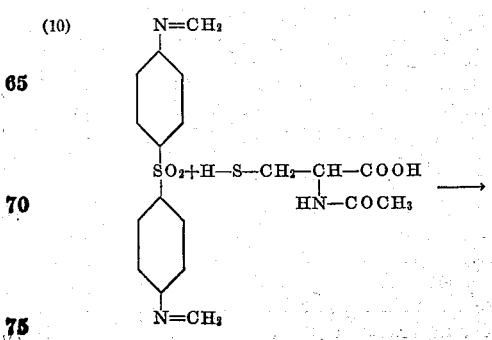

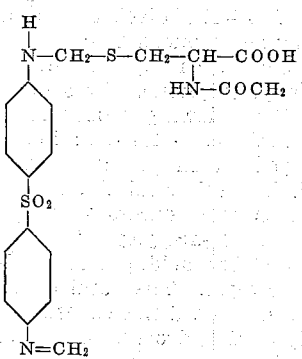

The compound N,N'-dimethylene-4,4'-diaminodiphenyl sulphone employed in this example is new and is described in our co-pending application, Serial No. 305,926, filed November 24, 1939, and is described and claimed in our co-pending application, Serial No. 338,659, filed June 3, 1940.

N,N'-dimethylene - 4,4' - diaminodiphenyl sulphone is obtained in excellent yield by treating 4,4'-diaminodiphenyl sulphone, suspended (with some solution) in alcohol, with slightly more than two molecular equivalents of formaldehyde solution (formalin) for each amino group; four to six moles of formaldehyde are used in our preferred procedure. Care must be taken to avoid the introduction of either acids or strong bases. The mixture is heated until a clear solution is obtained. Upon standing and chilling, the N,N'-dimethylene-4,4'-diaminodiphenyl sulphone crystallizes. It is sparingly soluble in cold alcohol and in acetone. The compound has no melting point. Upon heating it decomposes in the neighborhood of 260° C. It readily condenses with mercapto acids to produce condensation products which yield water-soluble salts.

*Example V.*—Examples I, II, III, and IV are repeated, save that instead of using N-acetylcysteine, an equivalent quantity is used of either N-β-bromopropionylcysteine, or N-benzoylcysteine, or N-nicotinylcysteine, or N-formylcysteine, or N-chloroacetylcysteine.

*Example VI.*—Examples I, II, III, IV, and V are repeated, save that instead of using alcohol solution of sodium hydroxide or sodium ethoxide, whether to obtain mono-sodium salts or di-sodium salts, we use alcohol solutions of the hydroxide or the ethoxide of other metals, such for instance as potassium ethoxide, calcium ethoxide, or magnesium ethoxide. Also instead of alcohol solutions of the hydroxides or ethoxides of any of these metals, we may use an alkylamine, such as methylamine, or an alkanolamine, such as ethanolamine, or a polymethylene diamine, such as ethylene diamine; these give substituted-ammonium salts, which may be either mono-salts or di-salts according to the method of preparing the salt. When methylamine, ethanolamine, diethanolamine, isopropanolamine, or dry ammonia gas are used the resultant salts are alcohol-soluble, but may be caused to separate from solution by the addition of relatively large quantities (say two to five volumes) of dry ether or acetone, preferably the latter. These salts are very water-soluble (indeed hygroscopic) and are usually obtained in the form of amorphous solids or gums, which may be suitably dried, as in vacuo. When the ethylenediamine is used in the proportion of about one mole of diamine to one mole of dicarboxylic acid, the resultant salt separates, at least in part, from alcoholic solution. More complete separation may be effected by the addition of dry ether or acetone. When ethylenediamine is used in the proportion of two or more moles of diamine to one mole of dicarboxylic acid as represented generically in Formula 1, the resultant salt is alcohol-soluble, but may be caused to separate from solution as described above for the ammonium and alkanolamine salts.

*Example VII.*—When the salts of acids described in Examples I, II, III, V, and VI are desired it is unnecessary to isolate the corresponding free acids. To prepare the salts directly we proceed as follows: To one molecular equivalent of 4,4-diaminodiphenyl sulphone, dissolved and suspended in an anhydrous solvent (suitably absolute ethyl alcohol), is added either one molecular equivalent each of formaldehyde solution and an N-acylcysteine, or two molecular equivalents each of formaldehyde solution and an N-acylcysteine, depending upon whether a salt of an N - (1 - carboxy - 1 - acylaminoethylthiomethyl) - 4,4'-diaminodiphenyl sulphone or of an N,N'-bis-(1-carboxy - 1 - acylaminoethylthiomethyl) - 4,4'-diaminodiphenyl sulphone is desired. A small amount of a strong, non-oxidizing acid, suitably hydrochloric acid, is added as catalyst. The total concentration of acid catalyst need not exceed 0.05%. The mixture is then agitated or allowed to stand until complete solution of solid material has been effected. The resultant solution is then chilled and filtered if necessary and is further treated with a suitable salt-forming reagent as already described in Examples I, II, III, and VI.

*Example VIII.*—Example IV is repeated, save that an anhydrous solvent, suitably absolute ethyl alcohol, is used, and the resultant alcoholic solution is treated directly with a salt-forming reagent, as described in Example VII, without intermediate isolation of the free acid.

In Examples I to IV inclusive the structure indicated in Formulas 4 to 10 inclusive shows N-(1-carboxy-1-acylaminoethylthiomethyl) or N,-N'-bis-1-carboxy - 1 - acylaminoethylthiomethyl derivatives of 4,4'-diaminodiphenyl sulphone without any methylol group in the benzene nucleus. It is known that when an aromatic primary amine is treated with formaldehyde in acid solution, some of the formaldehyde tends to condense with the aromatic ring to yield a methylol derivative. It is therefore possible that the products resulting from the practice of the methods described in the examples contain some of the methylol group in the benzene ring. The precise amount of the methylol compounds in the reaction products of these examples has not been ascertained.

We claim as our invention:

1. A substituted 4,4'-diaminodiphenyl sulphone in which a hydrogen atom of at least one of the two amino groups is substituted by a radical of the following general formula:

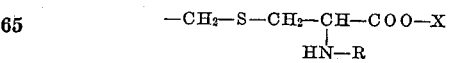

in which R represents an acyl group of the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids; and X represents a member of the class of positive ions consisting of hydrogen, the alkali metals, the normal equivalents of the alkaline-earth metals, the nitrogen hydro-onium ions derived from ammonia, the alkylamines, the alkanolamines, and the polymethylenediamines.

2. A di-substituted 4,4'-diaminodiphenyl sulphone which is represented by the following formula:

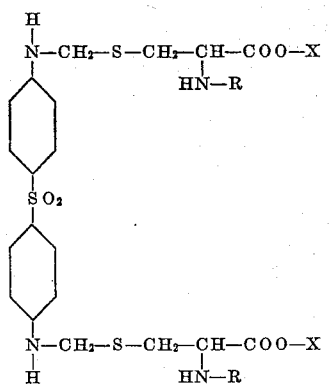

in which R represents an acyl group of the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids; and X represents a member of the class of positive ions consisting of hydrogen, the alkali metals, the normal equivalents of the alkaline-earth metals, the nitrogen hydro-onium ions derived from ammonia, the alkylamines, the alkanolamines, and the polymethylenediamines.

3. A mono-substituted 4,4'-diaminodiphenyl sulphone which is represented by the following general formula:

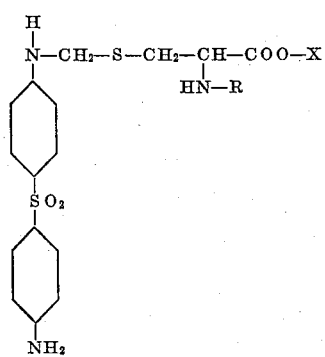

in which R represents an acyl group of the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids; and X represents a member of the class of positive ions consisting of hydrogen, the alkali metals, the normal equivalents of the alkaline-earth metals, the nitrogen hydro-onium ions derived from ammonia, the alkylamines, and alkanolamines, and the polymethylenediamines.

4. A di-substituted 4,4'-diaminodiphenyl sulphone which is represented by the following general formula:

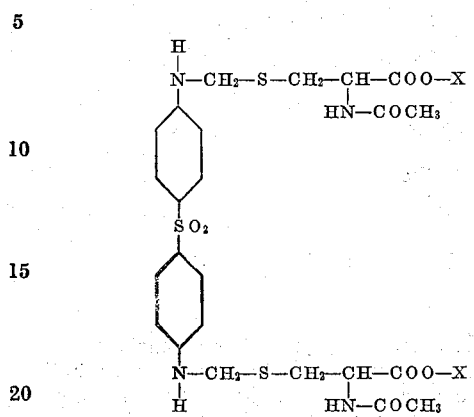

in which X represents a member of the class of positive ions consisting of hydrogen, the alkali metals, the normal equivalents of the alkaline-earth metals, the nitrogen hydro-onium ions derived from ammonia, the alkylamines, the alkanolamines, and the polymethylenediamines.

5. The di-sodium salt of a di-substituted 4,4'-diamino-diphenyl sulphone which is represented by the following formula:

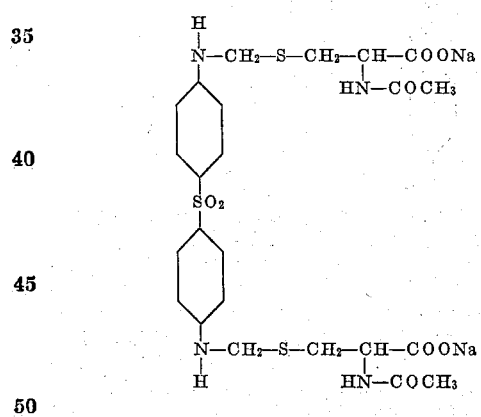

6. The mono-sodium salt of a di-substituted 4,4'-diaminodiphenyl sulphone which is represented by the following formula:

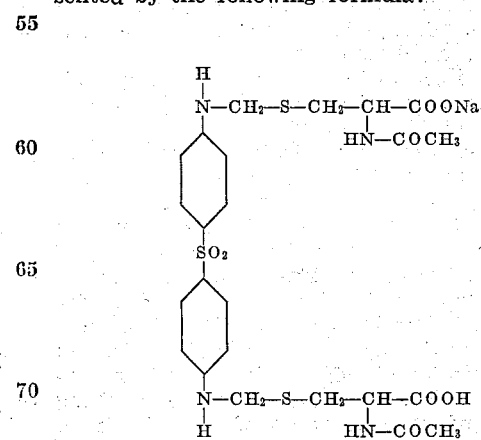

7. A mono-substituted 4,4'-diaminodiphenyl sulphone which is represented by the following general formula:

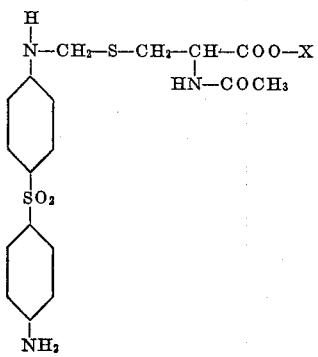

in which X represents a member of the class of positive ions consisting of hydrogen, the alkali metals, the normal equivalents of the alkaline-earth metals, the nitrogen hydro-onium ions derived from ammonia, the alkylamines, the alkanolamines, and the polymethylenediamines.

8. The sodium salt of mono-substituted 4,4'-diaminodiphenyl sulphone which is represented by the following formula:

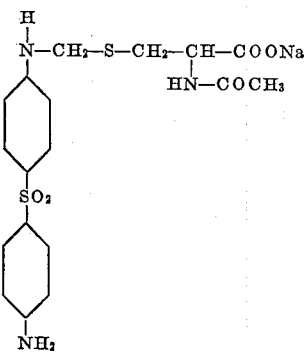

9. The process of producing a reaction product which consists in treating 4,4'-diaminodiphenyl sulphone with formaldehyde and with an N-acylcysteine, said N-acylcysteine having an acyl group of the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids.

10. The process of producing a reaction product in accordance with claim 9, in which the reaction is conducted in the presence of a non-oxidizing mineral acid.

11. The process of producing a reaction product in accordance with claim 9, in which the N-acylcysteine is N-acetylcysteine.

12. The process of producing a salt of a reaction product which consists in treating 4,4'-diaminodiphenyl sulphone with formaldehyde and with N-acylcysteine, said N-acylcysteine having an acyl group of the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids, and subjecting the resulting reaction product to the action of a base having a positive ion selected from the group which consists of the alkali metals, the normal equivalents of the alkaline-earth metals, the nitrogen hydro-onium ions derived from ammonia, the alkylamines, the alkanolamines, and the polymethylenediamines.

13. The process of producing a salt of a reaction product in accordance with claim 12, in which the N-acylcysteine is N-acetylcysteine.

14. The process of producing a reaction product which consists in treating N,N'-dimethylene-4,4'-diaminodiphenyl sulphone with an N-acylcysteine, said N-acylcysteine having an acyl group of the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids.

15. The process of producing a reaction product which consists in treating N,N'-dimethylene-4,4'-diaminodiphenyl sulphone with an N-acylcysteine in the presence of a nonoxidizing mineral acid, said N-acylcysteine having an acyl group selected from the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids.

16. The process of producing a reaction product in accordance with claim 15, in which the N-acylcysteine is N-acetylcysteine.

17. The process of producing a salt of a reaction product which consists in treating N,N'-dimethylene-4,4'-diaminodiphenyl sulphone with an N-acylcysteine in the presence of a nonoxidizing mineral acid, said N-acylcysteine having an acyl group of the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids, and subjecting the resulting product to the action of a base having a positive ion selected from the group which consists of the alkali metals, the normal equivalents of the alkaline-earth metals, the nitrogen hydro-onium ions derived from ammonia, the alkylamines, the alkanolamines, and the polymethylenediamines.

18. The process of producing a salt of a reaction product in accordance with claim 17, in which the N-acylcysteine is N-acetylcysteine.

19. The process of producing a reaction product which comprises treating an N-acylcysteine with a member of the class consisting of N,N'-dimethylene-4,4'-diaminodiphenyl sulphone and the two substances—4,4'-diaminodiphenyl sulphone and formaldehyde—said N-acylcysteine having an acyl group of the class consisting of those derived from the alkanoic and haloalkanoic acids of less than eight carbon atoms, those derived from the aryl monocarboxylic acids, those derived from the aryl monosulphonic acids, and those derived from the N-ring heterocyclic monocarboxylic acids.

MORRIS S. KHARASCH.
OTTO REINMUTH.

CERTIFICATE OF CORRECTION.

Patent No. 2,300,677. November 3, 1942.

MORRIS S. KHARASCH, ET AL.

It is hereby certified that error appears in the printed specification of the above numbered patent requiring correction as follows: Page 3, second column, lines 35 and 36, for that portion of the formula reading "CH—COOH"　　　　　　　CH—COOH
 |　　　　 read　　　　 |　　　　　;
HN—COCH$_3$　　　　　　 HN—COCH$_3$ page 4, first column, line 3, for that portion of the formula reading "HN—COCH$_2$" read --HN—COCH$_3$--; and that the said Letters Patent should be read with this correction therein that the same may conform to the record of the case in the Patent Office.

Signed and sealed this 22nd day of December, A. D. 1942.

(Seal)

Henry Van Arsdale,
Acting Commissioner of Patents.